United States Patent Office 3,066,095
Patented Nov. 27, 1962

3,066,095
WATER PURIFICATION AGENTS AND METHOD OF USING SAME
John J. Hronas, Pittsburgh, Pa., assignor to Hagan Chemicals & Controls, Inc., a corporation of Pennsylvania
No Drawing. Filed Sept. 30, 1959, Ser. No. 843,359
5 Claims. (Cl. 210—53)

This invention relates to the purification of water by means of improved treating agents and more especially to the clarificaion of water.

This is a continuation-in-part of my copending application entitled "Water Purification Agents and Method of Using Same," Serial No. 528,628, filed August 16, 1955, now abandoned, benefit of the filing date of which is claimed.

Virtually all potable waters, as well as many nonpotable waters which are used for industrial purposes, are clarified to remove substances which impart turbidity and objectionable color to the water. These substances are usually non-settling silt which is colloidal in particle size. Other turbidity-producers which are present in most waters are minute forms of plant life and certain microorganisms which are generally found in surface waters such as rivers, streams, lakes, and the like. Obviously, the colloidal silt particles present the major problem because they are present to some extent at all times, and during certain periods are present in very high concentrations, as for example during periods of climatic disturbances such as heavy precipitation, high winds, and the like.

As I have already stated, the objectionable finely divided matter in untreated waters may include silt, clay, plant life such as algae as well as bacteria and organic matter. The last of these contaminants may impart color to the water. Under certain conditions where concentrations of these objectionable materials do not exceed low limits, fairly effective removal may be achieved by slow sand filtration without the use of coagulants. However, coagulation is all-important where removal of turbidity, organic color, and bacteria is the principal object of treatment. In certain water treating plants, where additional treatment such as pre-chlorination, removal of tastes and odors with activated carbon, post-chlorination, etc. are required, coagulation will materially assist these operations.

In water treatment terminology, a coagulant is defined as an agent added to water to facilitate the settling out of colloidal or finely divided suspended matter. Coagulation is the treatment process which refers to a series of chemical and mechanical operations by which the coagulants themselves are applied and made effective. These operations are commonly divided into two distinct phases, i.e. mixing wherein the dissolved coagulant is rapidly dispersed throughout the water to be treated, usually accompanied by agitation, and flocculation, which involves agitation of the water at somewhat lower velocities for a much longer period of time, during which the very small particles grow and agglomerate into well-defined hydrated flocs of sufficient size to promote rapid settling. The broad term clarification is generally used to include both coagulation and sedimentation or settling out. For convenience, I define the water-soluble conventional coagulants as "common" coagulants.

The most widely used coagulants are aluminum or iron salts of either sulfuric or hydrochloric acid. Aluminum sulfate, $Al_2(SO_4)_3$ (sometimes designated as filter alum), is still the most widely used coagulant. Ferrous sulfate, $FeSO_4 \cdot 7H_2O$ (known as copperas), is also used to a great extent. Ferric sulfate, $Fe_2(SO_4)_3$ (sometimes known as "ferrifloc" or "ferrisul"), ferric chloride, $FeCl_3 \cdot 6H_2O$, and sodium aluminate, $Na_2Al_2O_4$, are also employed as coagulants.

The chemical reactions which occur during coagulation are somewhat complex, and involve not only the direct union of the coagulant ions with impurities in the water, but they also involve the formation of hydrous oxides. For example, the reaction of aluminum sulfate may be shown as follows:

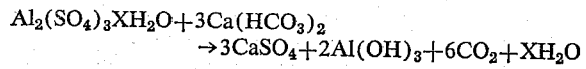

$$Al_2(SO_4)_3 \cdot XH_2O + 3Ca(HCO_3)_2$$
$$\rightarrow 3CaSO_4 + 2Al(OH)_3 + 6CO_2 + XH_2O$$

In this equation it will be noted that the aluminum sulfate reacts with the naturally occurring alkalinity of the water (shown as calcium bicarbonate, $Ca(HCO_3)_2$). The hydrous oxide, $Al(OH)_3$, is the floc which ultimately precipitates and removes the objectionable contaminants from the water.

The amount of coagulant required to completely free a water of turbidity will vary greatly from as little as 1 or 2 parts per million to more than 100 parts per million. The exact quantity of coagulant can usually be determined only by trial and error. The amount even thus determined will vary with other factors such as time of mixing, water temperature, etc. For example, the minimum quantity of coagulant determined to be effective in producing good flocculation in a given water would generally require a fairly long mixing time varying from 15 to 30 minutes in the summer and from 30 to 60 minutes in the winter when water temperatures approach the freezing point. Very finely divided suspended matter is more difficult to coagulate than the coarser particles, necessitating a larger amount of coagulant for a given turbidity. The character of the water also has considerable influence on the pH value at which satisfactory flocs may be formed. In some waters, it may be quite difficult to obtain good coagulation with alum at a pH of 7.5 whereas in other waters, especially those high in calcium bicarbonate, excellent coagulation may be obtained at a pH of 8.5 or even higher. Generally speaking, it has been found that natural waters need pH adjustment towards either the acid or alkaline side of 7 to obtain efficient and economical coagulation.

Although it is not necessary to discuss at great length the mechanism of flocculation, it should be pointed out that in the promotion of growth of the floc particles, flocculation depends both upon physical action, particularly agitation of the water and adhesion of the turbidity-producers, as well as upon those chemical or electronic forces which exert a material effect upon the physical action.

The physical action in the flocculation phase of coagulation is accomplished either by mechanical devices, called flocculators, or by a system of baffles in the mixing basin whereby the high mixing velocities are gradually reduced to a point where floc already formed in the mixing phase will not be broken up but will be maintained in suspension. The coagulation period will vary considerably from plant to plant. Generally speaking, the majority of water plants operate on a 10 to 30 minute coagulation period with the broad range being from 3 to 90 minutes.

Although it is sometimes possible to obtain satisfactory flocculation by the use of a single "common" coagulant as previously defined, many waters require a more complex type of treatment. A number of materials not per se considered coagulants have been found to possess properties which aid the coagulant in the performance of its function. These are denominated coagulant aids. Broadly speaking, alkalies such as lime and soda ash, or acids such as sulfuric, hydrochloric, and phosphoric acid may be considered coagulant aids. Sodium silicate partially neutralized with dilute sulfuric acid and known as "activated silica" is a coagulant aid.

In addition to the commonly used coagulants such as alum, copperas, and the like, certain highly colloidal clays of the swelling bentonite type have been used for clarification. These clays are produced generally in the vicinity of the Black Hills of Wyoming and South Dakota and they are capable of forming thick gels many times the volume of the original bentonite when added to water. They are sometimes denominated as "sodium bentonites," and their use for water purification purposes is fully described in U.S. Patents 2,345,827 and 2,362,022.

I have made the surprising discovery that by adding any one of the common coagulants to raw water, followed by addition of a bentonitic clay and small amounts of certain organic polyelectrolytes, I am able to drastically reduce the time formation of the hydrous flocs and appreciably accelerate the settling of the flocs to thereby clarify the water. When only alum or other common coagulant is used, or when these coagulants are used in conjunction with the bentonitic clays, the improvement secured by my processes is readily appreciated, as will be further described herein.

Furthermore, I have made the additional discovery that when my novel treatment is employed, rapid coagulation and settling of flocs are obtainable over a considerably wider pH range than when only the common coagulants are used. It will be appreciated by those skilled in the art that the broadening of the operative pH range is of considerable value since it reduces appreciably the precise control of pH which ordinarily is an essential in obtaining effective coagulation with the common coagulants.

While I prefer to use a bentonitic type of clay that is considered to be composed almost entirely of particles of montmorillonite that expand or swell greatly when dispersed in water, any clay which when dispersed in water will form a colloidal sol is effective to some extent in my process. Generally speaking, ball clays, kaolins, and other clays contain clay particles of such dimension that these particles are designated as "colloidal particles." If a sample of each of these clays is dispersed in water, a colloidal sol will be formed from that fraction of the sample which truly consists of colloidal particles. Although the non-bentonitic clays may be used as water-treating adjuncts in my process, the true bentonite-type clay is to be preferred. I have found particularly effective the bentonitic clays produced by American Colloid Company and designated as KWK Grade and SPV Grade.

The term "polyelectrolytes" in the field of chemistry is a broad one which embraces many substances. In the "Condensed Chemical Dictionary," 4th ed., 1950, published by Reinhold Publishing Company, polyelectrolytes are defined as follows: "High molecular weight electrolytes of either natural origin (proteins, polysaccharides) or of a synthetic nature . . . . They may be either weak or strong electrolytes. Since the polyelectrolytes in solution do not dissociate to give a uniform distribution of positive and negative ions, as do simple electrolytes, the ions of one sign are bound to the polymer chain. Thus for instance, the positive charges may be in the polymer chain, and only negative ions will be free to diffuse through the solvent."

I have found that the polyelectrolytes which are effective in my process are those which are capable of increasing the capacity of the bentonitic clay and the common coagulant to absorb the solids which are suspended in the water. I do not intend to be limited to a specific chemical theory of the mechanism of this water clarification process but it is well known that the suspended solids present in water carry either positive or negative charges. The bentonitic clay also carries either positive or negative charges as does the chemical coagulant such as alum or the like. Apparently the addition of certain polyelectrolytes to the coagulant-clay combination increases the surface charge density of either the clay or the hydrous floc which is formed, thereby increasing the ability of the floc and/or the clay nuclei to absorb the solids suspended in the water.

The particular polyelectrolyes which I have found effective in my process are water soluble cellulose derivatives, water soluble polyacrylamides, hydrolyzed water soluble polyacrylamides, and salts thereof, having an average molecular weight of at least 10,000. The materials whose trade names are listed on page 9 of my original application, Serial Number 528,628, of which this is a continuation in part are all believed to belong to this group.

In accordance with the present invention, the alum or other common coagulant is added to the water which is to be clarified according to standard practices. The pH value may be adjusted to obtain the most effective results from the coagulant which has been added, again in accordance with standard practice. The bentonitic clay or similar material is expanded in water to form a slurry in accordance with the teachings of U.S. Patent 2,345,827 and the polyelectrolyte is added to the water undergoing clarification along with the bentonite slurry. Flocculation is observed almost immediately and as the flocs grow larger and more visible, they surround and occlude particles of solid material which are sought to be removed. Ultimately as the flocs become larger, they settle to the bottom of the settling basin or other container in which the clarification process is being carried out.

Although not essential that the chemical coagulant be added to the water undergoing clarification prior to the bentonitic clay and the polyelectrolyte material, I may add the clay and polyelectrolytes simultaneously or I may add these two ingredients separately, either dissolving the polyelectrolyte, which is water soluble, followed by the addition of the bentonite slurry or alternatively, I may introduce the bentonite slurry and follow with the addition of the polyelectrolyte. It is particularly convenient to supply the bentonitic clay and polyelectrolyte mixed in dry form in the proper proportions so that they will be ready for use at the treating site. However, if the polyelectrolyte used is cationic or nonionic, the mixture will form a gelatinous mass on contact with water. Anionic polyelectrolytes, such as CMC, will not react with the clay in this manner, and be conveniently mixed prior to use. The mixture is introduced into the water after the alum and pH adjuster, if any, have been added, as a general rule.

The amount of organic polyelectrolyte which I use as a coagulant aid will vary depending upon the degree of turbidity of the raw water, the type of suspended matter, as well as the amount of common coagulant and clay which are used in the clarification process. Generally speaking, since the organic polyelectrolytes are considerably more costly than alumn or bentonitic clay, I prefer to use a minimal amount of these materials. I have found that in some instances as little as one-twentieth (1/20) parts per million of the organic polyelectrolyte will exert a marked influence upon the floc formation and settling rate. Generally speaking, I may use from as little as one-twentieth (1/20) parts per million of the polyelectrolyte up to three (3) parts per million, all calculations being based upon parts of polyelectrolyte per million parts of water undergoing clarification.

As far as the concentration of bentonitic clay is concerned, here again the optimum concentration will depend upon the type of suspended solids in the water, pH value of the water, and other variants but I have found that when the polyelectrolyte and bentonitic clay are used together, there should be a minimal concentration of clay which will be in the neighborhood of one-twentieth (1/20) parts per million of water. This amount will range upwards to fifteen (15) or twenty (20) parts or even thirty (30) parts per million or more if desired, but again there is no need to add more clay than sufficient to do the required job.

The effectiveness of my novel process can best be demonstrated by making laboratory jar tests using one liter water samples. A synthetic water containing 18 parts per million of calcium, 7 parts per million of magnesium, 90 parts per million of sodium, 27 parts per million $SO_4$, 154 parts per million chloride, and 34 parts per million $HCO_3$ was prepared. A Phipps and Bird multiple stirrer was employed for uniform mixing, a battery of test jars undergoing clarification simultaneously.

I used 35 p.p.m. of alum at pH 7.1, 50 p.p.m. of alum at pH 9.1, 25 p.p.m. of ferrifloc, $Fe_2(SO_4)_3 \cdot 9H_2O$, at pH 4.6 and 30 p.p.m. of copperas, $FeSO_4 \cdot 7H_2O$, at pH 9.2. In making my observations I added the pH adjusting material (either sodium hydroxide or hydrochloric acid) to one liter of the water sample, started the multiple stirrer and set its speed of rotation to 100 r.p.m. and then added the common coagulant which was rapidly dissolved in the water. The particular coagulant aid undergoing observation was then quickly added with or without clay, and the time required to form a floc after the addition of the coagulant aid was noted. By carrying out this procedure, I observed that a floc was formed far faster with a bentonitic clay-polyelectrolyte mixture than with only the common coagulant, the coagulant plus clay or the coagulant plus the polyelectrolyte. With the clay-polyelectrolyte mixes, extremely large floc particles were formed and they settled extremely rapidly.

The results of this experimental work using various coagulants and coagulant aids is tabulated herewith: (in each instance American Colloid Company KWK Grade volclay bentonite and Hercules Powder Company sodium carboxymethylcellulose No. 70 HV were used).

TABLE I

*Clarification of Water With 35 p.p.m. Alum at pH 7.1*

| Jar No. | Coagulant aid | Time required for floc formation (min.) | Estimated floc size [1] | Settling rate, estimated percent floc remaining suspended in the water | | |
|---|---|---|---|---|---|---|
| | | | | 1 min. | 10 min. | 20 min. |
| 1 | None | 4 | 1/32, very small | 100 | 85 | 70 |
| 2 | 5 p.p.m. clay | 2 | 1/16, small | 95 | 50 | 25 |
| 3 | 15 p.p.m. clay | 1½ | do | 95 | 40 | 25 |
| 4 | ¼ p.p.m. CMC | 3 | 1/20, very small | 98 | 65 | 40 |
| 5 | 5 p.p.m. mix (19 parts clay, 1 part CMC) | ¾ | 7/8, large | 40 | 1 | <1 |
| 6 | 15 p.p.m. mix (59 parts clay, 1 part CMC) | 1¾ | 1, large | 10 | <1 | <1 |

[1] Figures denote relative size with 1 being the largest.

TABLE II

*Clarification of Water With 50 p.p.m. Alum at pH 9.1*

| Jar No. | Coagulant aid | Time required for floc formation (min.) | Estimated floc size [1] | Settling rate, estimated percent floc remaining suspended in the water | | |
|---|---|---|---|---|---|---|
| | | | | 1 min. | 10 min. | 20 min. |
| 1 | None | >4½ | 0, none | 100 | 100 | 100 |
| 2 | 5 p.p.m. clay | 4½ | 1/16, small | 98 | 85 | 70 |
| 3 | 15 p.p.m. clay | 3 | do | 97 | 70 | 50 |
| 4 | ¼ p.p.m. CMC | >4½ | 0, None | 100 | 100 | 100 |
| 5 | 5 p.p.m. mix (19 parts clay, 1 part CMC) | 4 | ½, large | 50 | 8 | 3 |
| 6 | 15 p.p.m. mix (59 parts clay, 1 part CMC) | 2½ | 1, very large | 10 | 0 | 0 |

[1] Figures denote relative size with 1 being the largest.

TABLE III

*Clarification of Water With 35 p.p.m. Ferri-Floc at pH 4.6*

| Jar No. | Coagulant aid | Time required for floc formation (min.) | Estimated floc size [1] | Settling rate, estimated percent floc remaining suspended in the water | | |
|---|---|---|---|---|---|---|
| | | | | 1 min. | 10 min. | 20 min. |
| 1 | None | >4½ | 0, none | 100 | 100 | 100 |
| 2 | 5 p.p.m. clay | 1½ | 1/8, small | 80 | 40 | 30 |
| 3 | 15 p.p.m. clay | 1½ | do | 80 | 35 | 30 |
| 4 | ¼ p.p.m. CMC | 3 | do | 75 | 30 | 20 |
| 5 | 5 p.p.m. mix (19 parts clay, 1 part CMC) | 1 | 1, large | 20 | 3 | <1 |
| 6 | 15 p.p.m. mix (59 parts clay, 1 part CMC) | 1¼ | 7/8, fairly large | 20 | 3 | 1 |

[1] Figures denote relative size with 1 being the largest.

TABLE IV

*Clarification of Water With 30 p.p.m. Copperas at pH 9.2*

| Jar No. | Coagulant aid | Time required for floc formation (sec.) | Estimated floc size [1] | Settling rate, estimated percent floc remaining suspended in the water | | |
|---|---|---|---|---|---|---|
| | | | | 1 min. | 10 min. | 20 min. |
| 1 | None | 90 | 1/16, medium | 95 | 25 | 10 |
| 2 | 5 p.p.m. clay | 70 | 1/32, medium | 97 | 50 | 30 |
| 3 | 15 p.p.m. clay | 80 | 1/64, small | 100 | 70 | 60 |
| 4 | ¼ p.p.m. CMC | 45 | ¼, fairly large | 50 | 8 | 3 |
| 5 | 5 p.p.m. mix (19 parts clay, 1 part CMC) | 35 | 1, very large | 20 | 1 | <1 |
| 6 | 15 p.p.m. mix (59 parts clay, 1 part CMC) | 60 | ¾, large | 30 | 1 | <1 |

[1] Figures denote relative size with 1 being the largest.

TABLE V

*Clarification of Water With 35 p.p.m. Alum at pH 7.2*

| Jar No. | Coagulant aid | Time required for floc formation (min.) | Estimated floc size [1] | Settling rate, estimated percent floc remaining suspended in the water | | |
|---|---|---|---|---|---|---|
| | | | | 1 min. | 10 min. | 20 min. |
| 1 | None | 3 | 1/20 | 99 | 75 | 60 |
| 2 | 2 p.p.m. clay | 2½ | 1/8 | 90 | 30 | 20 |
| 3 | 5 p.p.m. clay | 1¾ | ¼ | 80 | 25 | 15 |
| 4 | 0.1 p.p.m. CMC | 2 | 1/20 | 99 | 35 | 25 |
| 5 | 2 p.p.m. mix (19 parts clay, 1 part CMC) | 1 | 1/10 | 80 | 20 | <5 |
| 6 | 5 p.p.m. mix (59 parts clay, 1 part CMC) | 1 | 1 | 40 | 15 | <5 |

[1] Figures denote relative size with 1 being the largest.

In the above tests after mixing has proceeded until floc forms in jar No. 1 (which contains the water sample to which only the common coagulant has been added) the speed of the stirrer was decreased to a speed of 60 r.p.m. and operated at that speed for 3 minutes and was then reduced to a speed of 20 r.p.m. and operated at that speed for 2 minutes more and then stirring was stopped entirely. The times shown under "settling rate" indicate elapsed time in minutes following the shutdown of the stirrer.

I have also found by experimenting with various raw waters on a large scale that the synergistic effect of mixtures of bentonitic clay and the various organic polyelectrolytes is equally noticeable. For example, an excellent floc was obtained in clarifying Ohio River water with 30 p.p.m. alum, 22 p.p.m. caustic soda for adjusting the pH value to 7.8, and 30 p.p.m. of a mixture of 29 parts bentonitic clay and 1 part Hercules Powder Company sodium carboxy-methylcellulose No. 70 HV. In this evaluation, the floc particles were very large and they settled with extreme rapidity.

I have also found that my process may be used to great advantage in clarifying water during a lime-soda softening process. In one case, using Pittsburgh tap water, I observed that the usual magnesium hydroxide and calcium carbonate turbidity which persists after addition of lime and soda ash to the water can be drastically reduced. Here, in jar tests, I added 43 p.p.m. soda ash, 64 p.p.m. lime, 30 p.p.m. bentonitic clay, and ⅜ p.p.m. of the CMC–70 HV. 10 p.p.m. of alum were also added and the pH of the water was 10.4. Excellent results were observed and the objectionable turbidity was quickly settled.

It will be obvious to those skilled in the art of water clarification that varying amounts of common coagulant will be employed depending upn the turbidity of the water and the nature of that turbidity. Also, the pH value during clarification will vary depending upon the characteristics of the turbidity and the coagulant employed. I do not intend to limit my disclosure to the use of my novel combination with any specific coagulant nor under any specific range of pH values. I am able to improve the speed of floc formation and settling rate over a wide range of concentration of my combined clay-polyelectrolyte mixture and although the preferred ratio of clay to polyelectrolyte is generally in the range of from about 1 part clay to 1 part polyelectrolyte to about 60 parts clay to 1 part polyelectrolyte, the presence of both essential components, regardless of the concentration of each and the ratio of components, is enough to confer material benefit. It should be noted that generally the concentration of the polyelectrolyte to be effective should be at least one-twentieth (1/20) p.p.m. That is, where the 1:1 mixture of clay and polyelectrolyte is used, a minimum of one-tenth (1/10) p.p.m. of the mixture is necessary to achieve desirable results; where a 20:1 mixture of clay to polyelectrolyte is used, a minimum of about one (1) p.p.m. of the mixture is necessary to achieve desirable results; where the 59:1 mixture is used, about three (3) p.p.m. of the mixture is necessary. I have found that the optimum dosage considering efficiency, economics, and time for the clarification of average surface waters such as those of rivers, lakes, and the like, is about one-fourth (¼) p.p.m. of the 1:1 mixture, about two (2) p.p.m. of the 15:1 mixture, or about five (5) p.p.m. of the 59:1 ratio of clay to polyelectrolyte. Where the water treated contains large amounts of suspended solids larger doses may be required.

While the several experiments I have presented herein involve the stepwise addition of clay and polyelectrolyte, there is nothing unduly critical about such a sequence of addition except where the pH value of the water may be 9 or higher. Below a pH of 9, I may add the alum or other coagulant along with the bentonitic clay and polyelectrolyte and obtain excellent results. Alternatively, a clay- anionic polyelectrolyte mixture may first be added to the water followed by the coagulant itself.

In the foregoing description I have emphasized the effectiveness of the sodium salt of carboxymethylcellulose. Additionally, many other modified cellulose derivatives which are water soluble or which can be solubilized in water are useful. For example, cellulose gums CMHEC types 37 and 43 made by Hercules Powder Company which is the sodium salt of carboxymethyl hydroxyethyl cellulose is effective in my process. Generally speaking, any of the cellulosic derivatives which confer upon the bentonitic clay and/or the hydrous flocs formed during clarification improved adsorbency of the solids suspended in the water are effective.

Having thus described my invention, what I claim is:

1. A method of clarifying water which comprises contacting the water with a water-soluble inorganic coagulant, a bentonitic clay, and an organic polyelectrolyte which is capable of increasing the capacity of both the bentonitic clay and the water-soluble coagulant to adsorb and absorb solids which are suspended in the water, said polyelectrolyte selected from the group consisting of water-soluble cellulose derivatives, water-soluble polyacrylamides, hydrolyzed water-soluble polyacrylamides, and salts thereof, having an average molecular weight of at least 10,000, thereby forming a floc and separating a purified water from said floc.

2. A method of clarifying water which comprises contacting the water with an effective amount of a water-soluble inorganic coagulant selected from the group consisting of aluminum sulfate, ferric chloride, ferric sulfate, ferrous sulfate, and sodium aluminate, at least 0.05 part per million of a bentonitic clay and at least 0.05 part per million of an organic polyelectrolyte which is capable of increasing the capacity of both the bentonitic clay and the water-soluble coagulant to adsorb and adsorb solids which are suspended in the water, said polyelectrolyte selected from the group consisting of water-soluble cellulose derivatives, water-soluble polyacrylamides, hydrolyzed water-soluble polyacrylamides, and salts thereof, having molecular weight of at least 10,000, thereby forming a floc and separating a purified water from said floc.

3. A method as described in claim 2 where the weight ratio of bentonitic clay to organic polyelectrolyte is from about 1 to 1 to about 100 to 1 and where the dosage of organic polyelectrolyte is at least 0.05 p.p.m. based on the water undergoing clarification.

4. A method of clarifying water by means of conventional water-soluble coagulant chemicals which comprises adding to the water in the presence of the coagulant an effective amount of a bentonitic clay, and a water-soluble organic polyelectrolyte which is capable of increasing the capacity of the coagulant to adsorb and absorb solids suspended in the water, said polyelectrolyte being selected from the group consisting of water-soluble cellulose derivatives, water-soluble polyacrylamides, hydrolyzed water-soluble polyacrylamides, and salts thereof, and having an average molecular weight of at least 10,000.

5. A method as described in claim 4 where the bentonitic clay is present in an amount ranging from about 0.05 p.p.m. to about 30 p.p.m. and the organic polyelectrolyte is present in an amount ranging from about 0.05 p.p.m. to about 3 p.p.m., in which the ratio of bentonitic clay to organic polyelectrolyte varies from about 1:1 to about 100:1.

References Cited in the file of this patent

UNITED STATES PATENTS 2,284,827    Lindsay et al. _____ June 2, 1942

(Other references on following page)

UNITED STATES PATENTS

| | | |
|---|---|---|
| 2,393,269 | Rudolfs | Jan. 22, 1946 |
| 2,613,180 | Green | Oct. 7, 1952 |
| 2,728,725 | Gloor | Dec. 27, 1955 |
| 2,862,880 | Clemens | Dec. 2, 1958 |
| 2,937,143 | Goren | May 17, 1960 |

OTHER REFERENCES

Gehm: "Sewage Works Journal," vol. 13, 1941, pages 681–689.

Industrial and Engineering Chemistry, vol. 46, No. 11, November 1954, article by Powell, pages 85A and 86A.